US008769492B2

(12) United States Patent
Speare et al.

(10) Patent No.: US 8,769,492 B2
(45) Date of Patent: *Jul. 1, 2014

(54) METHOD FOR UPDATING DATA IN ACCORDANCE WITH RIGHTS MANAGEMENT POLICY

(75) Inventors: John Gerard Speare, Spokane, WA (US); Christopher Frederick Graham, Kirkland, WA (US); Peter David Waxman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

This patent is subject to a terminal disclaimer.

(21) Appl. No.: 13/250,564

(22) Filed: Sep. 30, 2011

(65) Prior Publication Data

US 2012/0023595 A1 Jan. 26, 2012

Related U.S. Application Data

(63) Continuation of application No. 10/806,779, filed on Mar. 23, 2004, now Pat. No. 8,117,595.

(51) Int. Cl.
*G06F 9/44* (2006.01)
*G06F 21/10* (2013.01)
*G06F 21/60* (2013.01)

(52) U.S. Cl.
CPC .......... *G06F 21/105* (2013.01); *G06F 21/604* (2013.01); *G06F 21/606* (2013.01)
USPC ...................................................... 717/120

(58) Field of Classification Search
CPC ...... G06F 21/10; G06F 21/60; G06F 2221/00
USPC ................. 717/101–103, 120–123, 168–172
See application file for complete search history.

(56) References Cited

U.S. PATENT DOCUMENTS 5,764,992 A    6/1998  Kullick et al.
6,199,204 B1   3/2001  Donohue
(Continued)

FOREIGN PATENT DOCUMENTS

CN    1332881         1/2002
GB    2381153  A      4/2003
JP    2007131480      5/1995
JP    2008008965      12/1996
(Continued)

OTHER PUBLICATIONS

Authentica, "Mail Recall," 2001, 2 pages.
(Continued)

*Primary Examiner* — Ted T Vo
(74) *Attorney, Agent, or Firm* — Louise Bowman; Jim Ross; Micky Minhas

(57) ABSTRACT

Disclosed is a computerized system and method for dynamically applying a rights management policy to a message by allowing an administrator to associate certain rights management policies with certain senders and recipients of messages, with groups of users possessing certain common criteria which define the users and groups of users, with certain attributes of the message, and with certain environmental attributes. In some embodiments, an administrator is allowed to automatically update a rights management protected message as it passes through a message transfer agent. The administrator may determine either on a regular interval or an ad-hoc basis that the message transfer agent scan the messages stored to determine whether or not the content has expired. If the content has indeed expired the administrator may take steps to have the expired content deleted entirely, refreshed with more current content, or replaced with a tombstone indicating that the original content has expired.

20 Claims, 8 Drawing Sheets

(56) References Cited

U.S. PATENT DOCUMENTS

| | | |
|---|---|---|
| 6,202,207 B1 | 3/2001 | Donohue |
| 6,269,382 B1 | 7/2001 | Cabrera et al. |
| 6,272,631 B1 | 8/2001 | Thomlinson et al. |
| 6,427,140 B1 | 7/2002 | Ginter et al. |
| 6,449,367 B2 | 9/2002 | Va Wie et al. |
| 6,584,565 B1 | 6/2003 | Zamek |
| 6,640,304 B2 | 10/2003 | Ginter et al. |
| 6,871,232 B2 | 3/2005 | Curie et al. |
| 6,938,021 B2 | 8/2005 | Shear et al. |
| 7,092,914 B1 | 8/2006 | Shear et al. |
| 7,093,296 B2 | 8/2006 | Nusser et al. |
| 7,110,983 B2 | 9/2006 | Shear et al. |
| 7,143,066 B2 | 11/2006 | Shear et al. |
| 7,430,754 B2 | 9/2008 | Speare et al. |
| 8,117,595 B2 * | 2/2012 | Speare et al. .......... 717/120 |
| 2005/0021635 A1 | 1/2005 | Graham et al. |

FOREIGN PATENT DOCUMENTS

| | | |
|---|---|---|
| JP | 11-272582 | 10/1999 |
| JP | 2001028265 A | 1/2001 |
| JP | 2001-282651 A | 10/2001 |
| JP | 2002108365 A | 4/2002 |
| JP | 2002-183055 | 6/2002 |
| JP | 2003114852 | 4/2003 |
| JP | 2003186808 | 7/2003 |
| JP | 2009198328 A | 9/2009 |
| JP | 2009233115 A | 10/2009 |
| WO | 9905814 | 2/1999 |

OTHER PUBLICATIONS

Wiesenberg, Mark, Tumbleweed Communications, "Tumbleweed Secure Messenger," 2004, 4 pages.

SealedMedia, "A Software Developer's Kit," www.sealedmedia.com, pp. 1-45, Aug. 2002.

* cited by examiner

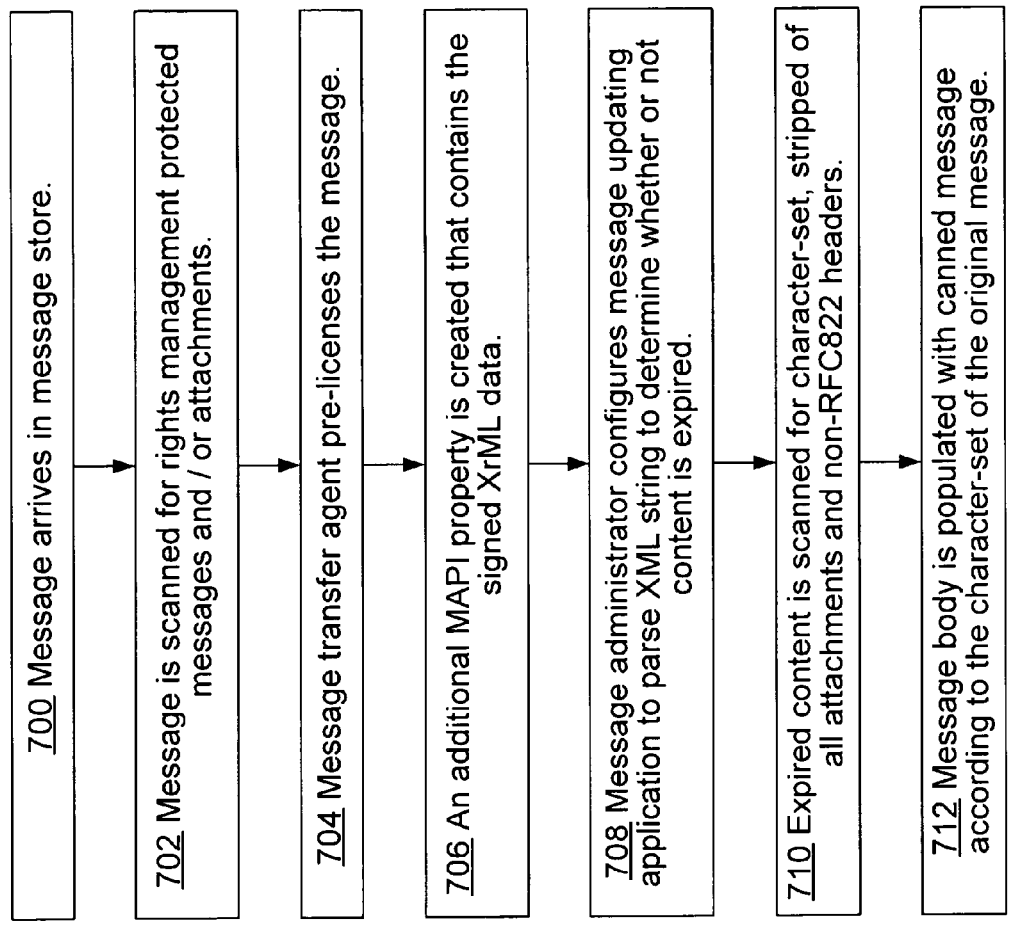

METHOD FOR UPDATING DATA IN ACCORDANCE WITH RIGHTS MANAGEMENT POLICY

TECHNICAL FIELD

The present invention relates generally to the distribution of protected content in a rights management system and, more particularly, to methods for dynamically applying rights management to a piece of data and methods for updating a piece of data that has been accorded a rights management policy.

BACKGROUND

Rights management services provide software that protects ownership/copyright of electronic content by restricting what actions an authorized recipient may take in regard to that content. The term content refers to information and data stored in digital format including: pictures, movies, videos, music, programs, multi-media, games, documents, etc. A few of the primary functions of rights management services are to control licensing authorization so that content is unlocked only by authorized intermediate or end-users that have secured a license, and to control content usage according to the conditions of purchase or license or otherwise imposed by the author (e.g., permitted number of copies, number of plays, the time interval or term the license may be valid, or actions that may be performed on the content, such as further distribution, opening or accessing, printing, and the like). Another function of rights management services may be to identify the origin of unauthorized copies of content to further combat piracy.

Originally, the idea of rights management was used to protect against the on-line piracy of commercially marketed material such as digital periodicals, books, photographs, educational material, video, music, etc. The use of rights management, however, has become increasingly popular in the business setting to protect proprietary or confidential information within a business network. For example, a CEO of a large corporation may wish to distribute an e-mail that includes trade secrets. Because of the confidential nature of this information, however, the CEO may wish to limit the actions recipients may take in regard to this content. For example, the CEO may wish to allow upper-level management to read, copy, print, and save the confidential information; however, she may wish to limit other employees to read-only access or to no access at all. Accordingly, through the use of rights management services the CEO can specify who is authorized to view the protected content and what actions they may take in regards thereto.

The above illustrates just one of many examples of the importance of controlling content in a business network environment. Although rights management is becoming a popular tool in a business environment, there currently exist several drawbacks and deficiencies in the system. For example, typically the onus of protecting a piece of e-mail using rights management policies rests entirely upon the sender. That is, if the sender wants to protect an e-mail (e.g., make it confidential by restricting forwarding/saving/printing/copying of the e-mail message or set a condition upon which the message will expire), he must select the recipients and then manually apply an appropriate rights management protection to the e-mail. In some cases the protection is associated with a template (default or administrator created), in other cases the sender protects the e-mail according to specific criteria. Unfortunately, experience has shown that the more hoops a user must jump through to comply with a security policy, the less likely it is that the user will comply. Accordingly, the sender's employer may desire the ability to dynamically apply rights management to the e-mail message once the sender has created and initiated sending of the e-mail message.

Another drawback of the current rights management services occurs when a sender has set a date for when the content will expire. The behavior of content expiration is such that, when a recipient attempts to open a document (or e-mail) that has expired, the document is empty. Under the covers the content is still there, however it is being programmatically removed at runtime. Given enough time, a skilled hacker could crack an expired rights management-protected file if he has access to it. Furthermore there may be additional drawbacks to having the underlying content persisted beyond the desired expiration. For example, a corporation may have mail retention policies that apply to specific types of information (e.g., a law firm may require that all mail about a specific case is to be purged after 2 years). Additionally, with the continuing proliferation of e-mail coupled with rich (and large) content, users are sending more and larger e-mail than ever before. This situation results in storage bloat on the e-mail server and forces e-mail administrators to allocate more and more disk space for their users. Accordingly, there exists a need for a method to assure that any expired rights management-protected e-mail or attachment to an e-mail is deleted as it passes through a message transfer agent such as an e-mail server.

SUMMARY

In view of the foregoing, the present invention provides a method for dynamically applying a rights management policy to a message by allowing an administrator to associate certain rights management policies with certain senders and/or recipients of messages. In one embodiment the administrator may associate certain rights management policies with established groups of users such as an e-mail distribution list. Additionally, an administrator may associate certain rights management policies with groups of users possessing certain common criteria which define the users and/or groups of users such as attributes of the users as defined by the Active Directory service by Microsoft of Redmond, Wash.

Additionally the present invention provides a method for dynamically applying a rights management policy to a message by allowing an administrator to associate certain rights management policies with certain attributes of the message. In one embodiment the administrator may associate certain right management policies based on such attributes as the content of the message, the sending and receiving parties, and the date of the message.

A further method of the present invention provides a method for dynamically applying a rights management policy to a message by allowing an administrator to associate certain rights management policies with certain environmental attributes. In one embodiment the administrator may associate certain right management policies based on such environmental attributes as the recipient's location, the time of day, the level of network traffic, whether the recipient is on-line or off-line, and certain software and/or hardware configuration on the recipient's computing device.

In view of the foregoing, the present invention also provides a method for allowing an administrator to automatically update a rights management protected message and/or rights management protected documents attached to that message as it passes through a message transfer agent. In one embodiment the administrator may determine either on a regular interval or an ad-hoc basis that the message transfer agent scan the messages stored to determine whether or not the content has expired. If the content has indeed expired the administrator may take steps to have the expired content deleted entirely, refreshed with more current content, or replaced with a tombstone indicating that the original content has expired.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 is a flowchart illustrating the method of the present invention for automatic updating of a rights management protected message.

DETAILED DESCRIPTION

Figure 1:
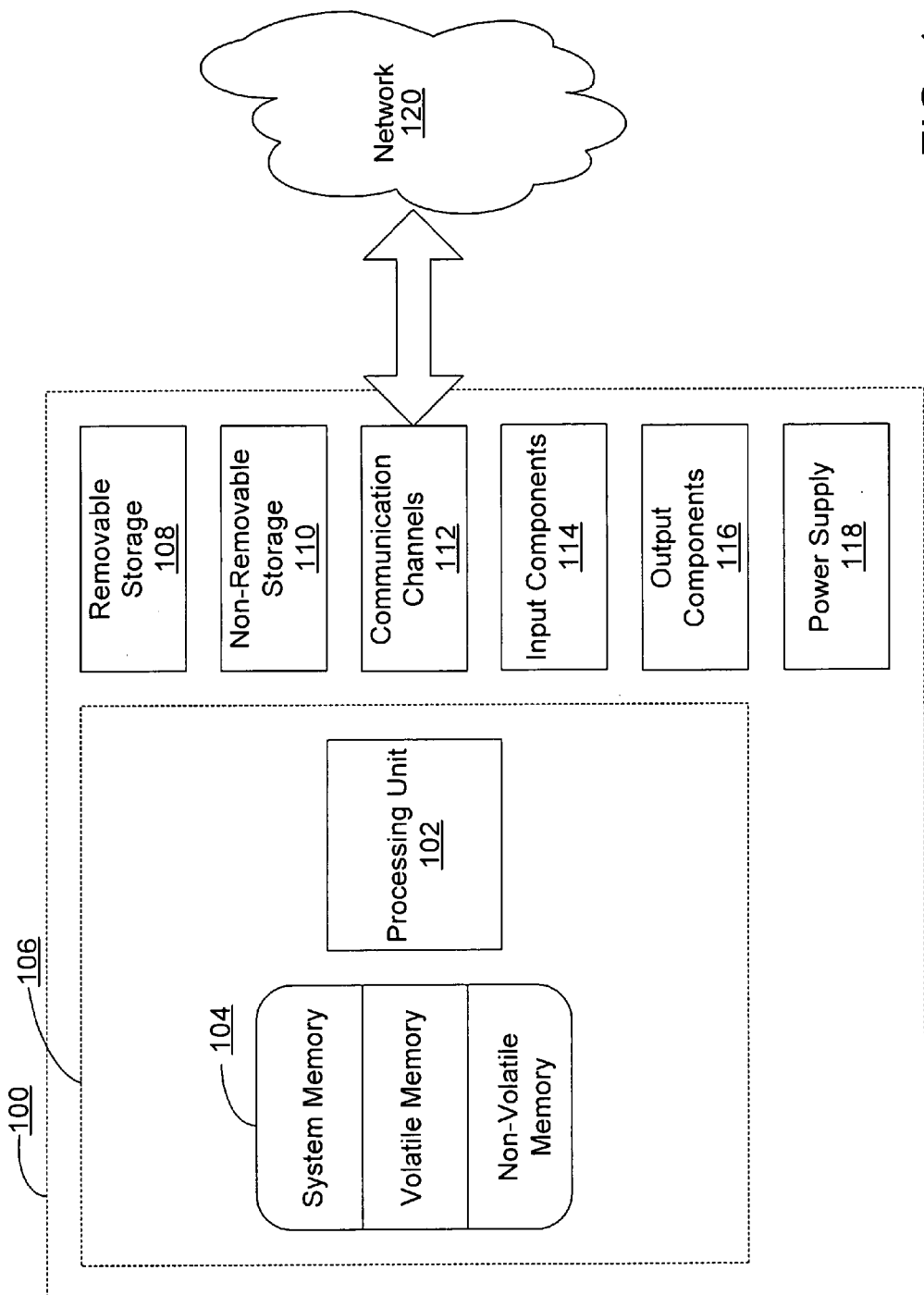
FIG. 1 is a schematic diagram of an exemplary computer architecture on which the method of the invention can be implemented.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Referring to FIG. 1, the present invention relates to communications between network nodes on connected computer networks. Each of the network nodes resides in a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 10 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 10 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Interactive Application of Rights Management

The present invention is directed to methods for dynamically applying a rights management policy to a message and methods for allowing an administrator to automatically update a rights management protected message. In the description that follows the invention is described as being implemented in a message transfer agent application such as Exchange by Microsoft of Redmond, Wash. As will be appreciated by one of ordinary skill in the art, the protected message is, in one embodiment, an electronic mail communication which should be understood to include meeting requests, contacts, tasks, documents, and similar data items implemented in Exchange and other message transfer agent applications.

Figure 2A:
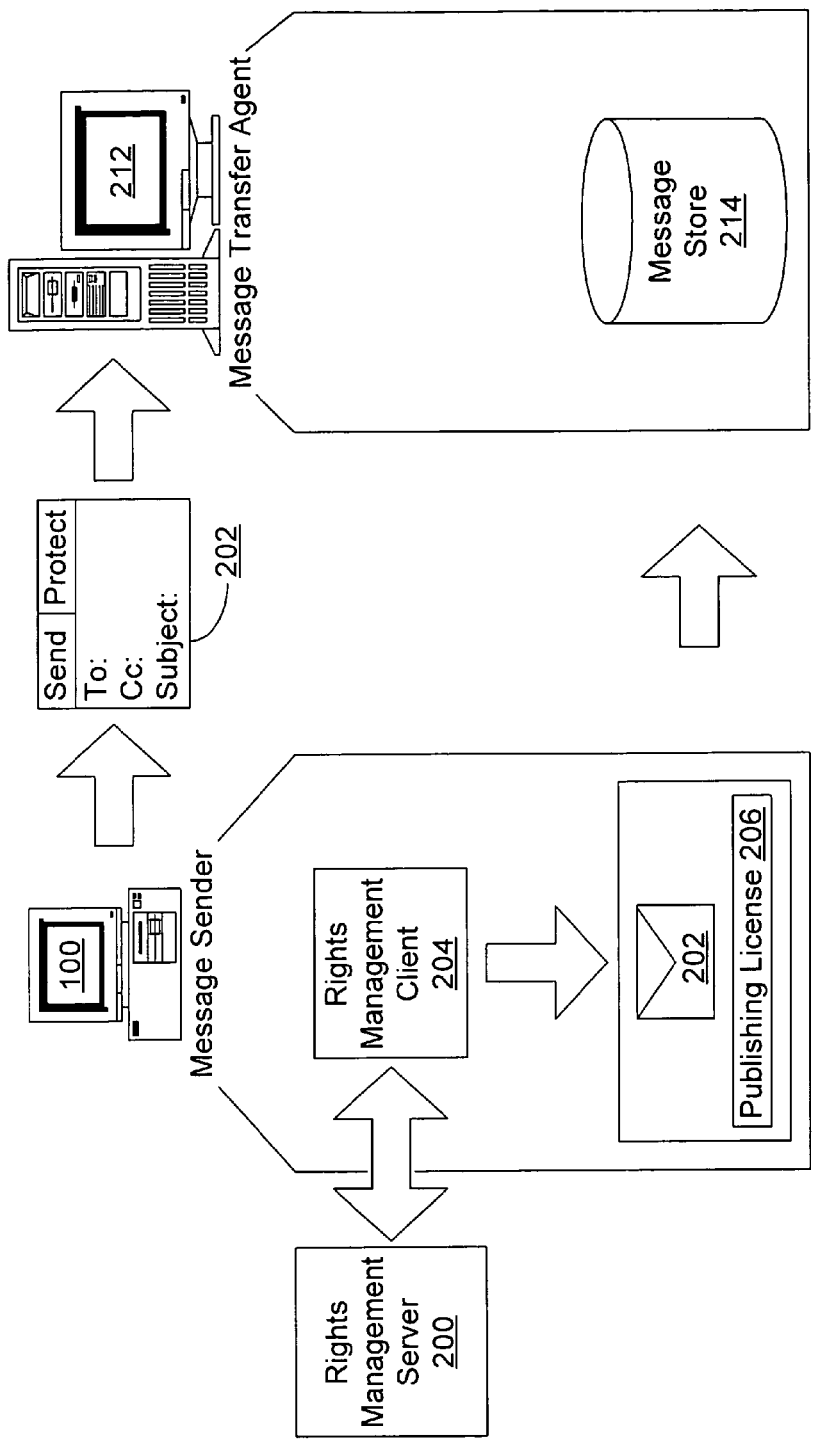
FIG. 2a is a schematic diagram showing an exemplary rights management enabled messaging architecture.
Figure 2B:
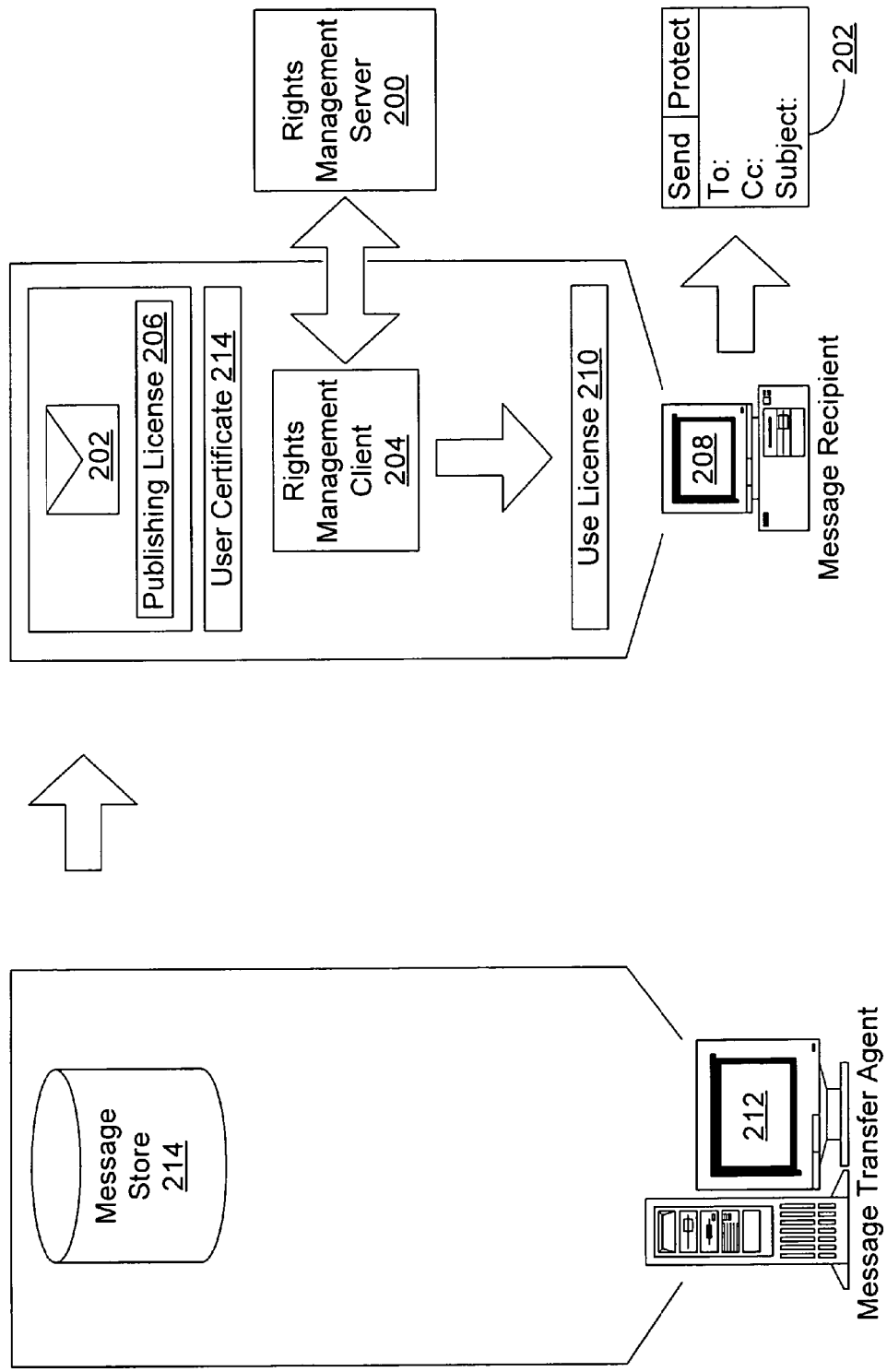
FIG. 2b is a schematic diagram showing an exemplary rights management enabled messaging architecture.

Referring to FIGS. 2*a* and 2*b*, an exemplary message system architecture employing a rights management scheme is represented. A message sender 100 that is enrolled in a rights management service and is registered with a rights management server 200 may elect to apply rights management protection to a message 202 at the time of sending. Typically the sender 100 will select a "Protect" button on the toolbar of the message editor. Alternatively, the sender may also select a "Protect" menu item from the menu of the message editor. Upon selecting the appropriate mechanism by which to protect the message 202 the sender 100 will choose the desired protections for the message 202. For example, there may be an option which allows the sender 100 to choose from a list of protections (e.g. do not forward, do not save, do not print, do not copy, and expire content) to apply to the message 202. Alternatively, selecting the protection option may prompt the sender 100 to choose from a list of rights management templates as defined by an administrator. For example, a template named "Confidential" may exist which when selected by the sender 100 to be applied to the message 202 applies a predefined set of protections to the message 202, such as do not forward and do not print.

Upon selecting the appropriate protections for the message 202, the rights management client application 204 initiates contact with the rights management server 200 to obtain a publishing license 206 to send to the message recipient 208 with the protected message 202. Accordingly, the rights management client application 204 encrypts the content of the message 202 and makes a request for a publishing license 206 from the rights management server 200. This request may include such things as a rights expression, a content key encrypted to the public key of the rights management server, and a hash of the content. The rights expression will typically specify whom the protected content is intended for and what each recipient of that content can do. The content key (not shown) is a symmetric key typically created by the rights management client application 204 to be used in encrypting/decrypting the protected content. Finally, the hash may later be used to verify that the content does not change when received and opened by the message recipient 208.

The rights management server 200 may then create a publishing license 206, which may be encrypted information signed by the rights management server 200. The information may simply be any combination of the rights expression, a content key identifier, and/or hash of the content. Accordingly, when the rights management server 200 later receives the publishing license 206 and a request for a use license 210 (described below) the rights management server 200 can be assured that it was the one who created the publishing license 206. Further, the rights management server 200 may use the content key identifier to locate the content key in its database when issuing a use license 210, as described herein after.

Thereafter, the rights management client application 204 receives the publishing license 206, which it can now attach to the protected content 202 to send to the message recipient 208. This is typically a one time operation, usually done the first time the message sender 100 attempts to send protected content. A protected message 202 and the publishing license 206 may be sent from the message sender 100 to a message recipient 208 by simply attaching the publishing license 206 to the protected message 202 and forwarding it to its message transfer agent 212. The sender's message transfer agent 212 then finds the appropriate recipient's message transfer agent 212 and forwards the protected message 202 and the publishing license 206 to the recipient's message transfer agent 212. When the recipient 208 logs-on to its message transfer agent 212 the recipient's message transfer agent 212 sends the protected message 202 and the publishing license 206 to the recipient 208.

The recipient 208 may recognize the message 202 as protected and attempt to obtain a use license 210 from the rights management server 200. First, the rights management client application 204 can make a request for a use license 210 from the rights management server 200. Typically, the request for the use license 210 will include the publishing license 206 and the recipient's user certificate 214, which the rights management server 200 uses to verify that the recipient 208 is an authorized user.

Once the rights management server 200 verifies the authenticity of the publishing license 206 and the recipient's 208 identity it can send the use license 210, which includes the previously saved content key, to the rights management client application 204. The content key should be encrypted to the recipient's private key (not shown), which is obtained in the registration process. Accordingly, when the rights management client application 204 receives the use license 210 containing the encrypted content key it can provide the use license 210 to ensure that the application is trustworthy to handle the decrypted content. The rights management client application 204 may then use the private key to decrypt the content key, and subsequently use the content key to decrypt the content that is protected 202. The rights management client application 204 can then provide the decrypted content over to the appropriate application along with the restrictions that were defined in the publishing license 206 and/or use license 210 to place the appropriate restrictions on the protected content.

III. Dynamic Application of Rights Management Policy

As detailed above, typically the onus of protecting a message using rights management policies rests entirely upon the message sender. That is, if the sender wants to a protect a message (e.g., make it confidential by restricting forwarding/saving/printing/copying of the message or set a condition upon which the message will expire), he must select the recipients and then manually apply an appropriate rights management protection to the message. Unfortunately, experience has shown that the more hoops a user must jump through to comply with a security policy, the less likely it is that the user will comply. Accordingly, the sender's employer may desire the ability to dynamically apply rights management to the message once the sender has created and initiated sending of the message.

Figure 3:
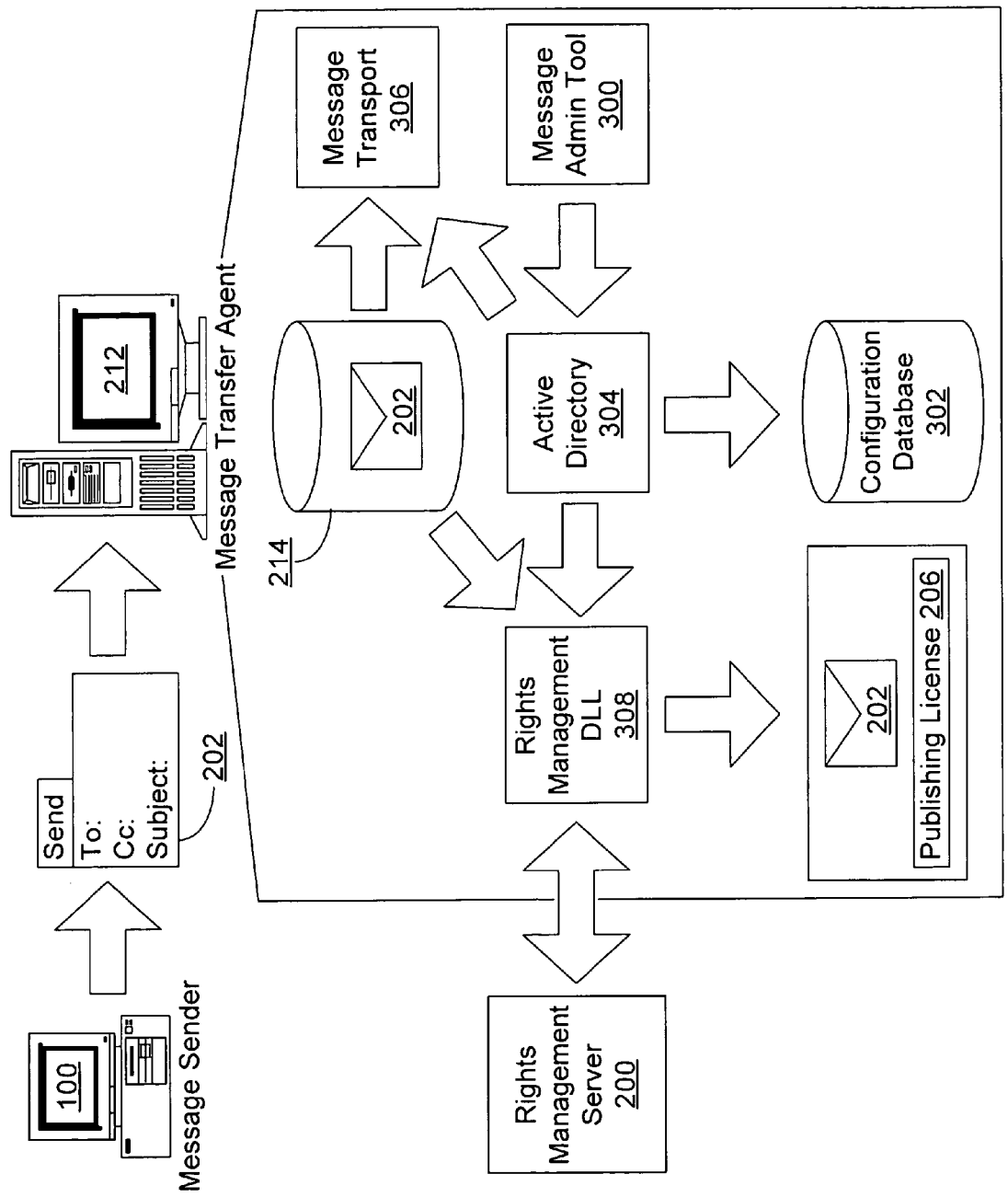
FIG. 3 is a schematic diagram showing a rights management enabled messaging architecture employing the dynamic rights management policy application method of the present invention.
Figure 4:
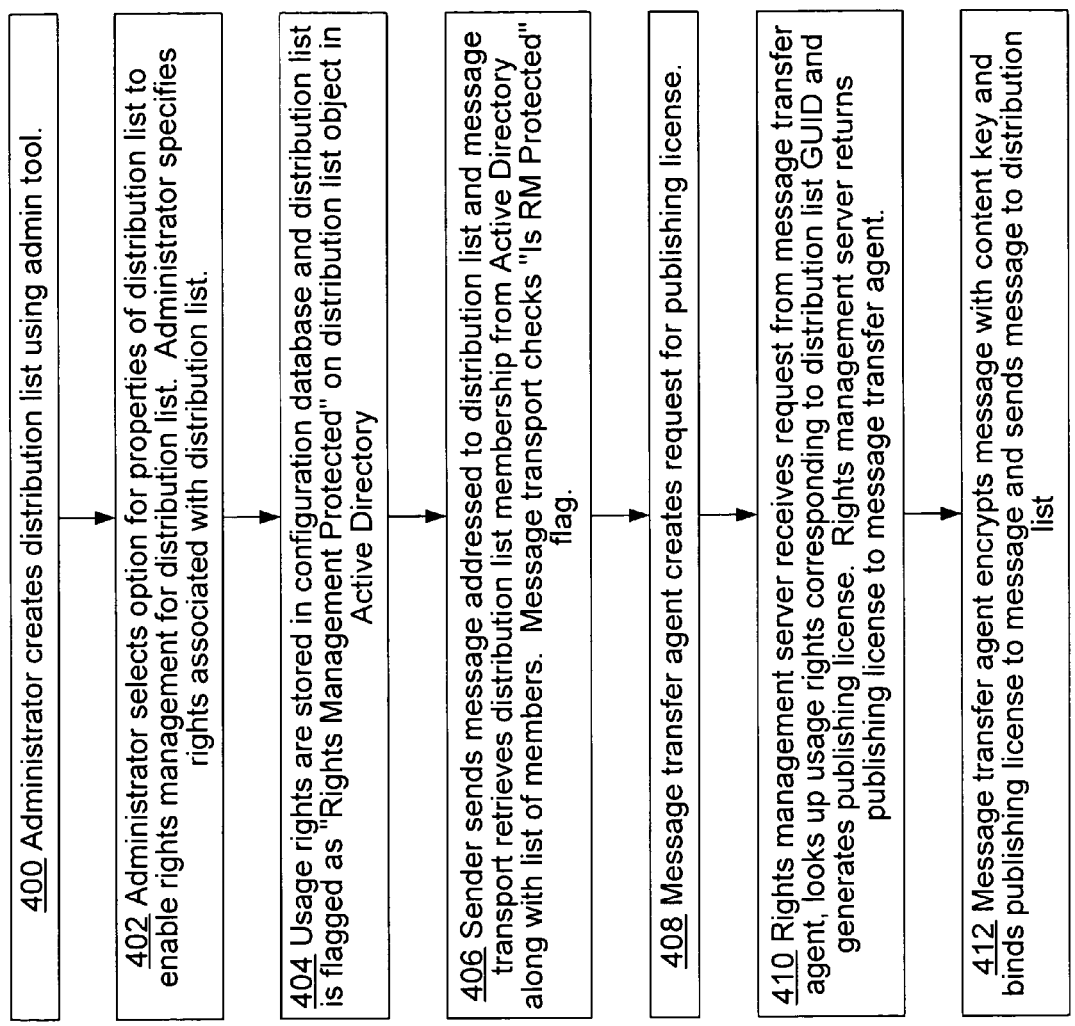
FIG. 4 is a flowchart illustrating the dynamic rights management policy application method of the present invention.

Turning to FIGS. 3 and 4 a method for dynamically applying a rights management policy to a message is illustrated. The present invention provides for the dynamic application of rights management to a message by allowing an administrator to associate certain rights management policies with certain senders and/or recipients of messages. In one embodiment the administrator may associate certain rights management policies with established groups of users such as an e-mail distribution list.

Beginning with step 400, an administrator creates a distribution list with a message administration tool 300. Next, in step 402, at the time of creation of the distribution list, the administrator may select an option for the properties of the distribution list to enable rights management for this distribution list. From here, the message administration tool 300 allows the administrator to specify the rights associated with this distribution list. In step 404, these usage rights are stored in a configuration database 302 (referenced by the GUID of the distribution list as specified in the Active Directory 304) and the distribution list is flagged as "Rights Management Protected" on the distribution list object in the Active Directory 304. In step 406 a sender 100 sends a message 202 addressed to the given distribution list and the message transport 306 retrieves the distribution list membership from the Active Directory 304 along with the list of members. The message transport 306 checks the "Rights Management Protected" flag. Because the distribution list is rights management protected, in step 408 the message transfer agent 212 creates a request for a publishing license 206. Using a rights management dll 308 on the server, the message transfer agent 212 generates a content key and creates a request for the rights management server 200. Instead of specifying the usage rights in the request, however, the message transfer agent 212 references the GUID of the distribution list. Next, in step 410, the rights management server 200 receives the request from the message transfer agent 212, looks up the usage rights corresponding to the distribution list GUID and generates the publishing license 206. The rights management server 200 then seals the content key to the message transfer agent 212 private key and returns the publishing license 206 to the message transfer agent 212. Finally, in step 412 the message transfer agent 212 encrypts the message 202 with the content key and binds the publishing license 206 to the message 202 and sends the message 202 to the distribution list.

While the above example illustrates a method for dynamic application of a rights management policy for a message based on a distribution list, several alternative embodiments are also contemplated by the present invention. In the above example the message administrator may instead associate certain rights management policies with groups of users possessing certain common criteria which define the users and/or groups of users such as attributes of the users as defined by the Active Directory service by Microsoft of Redmond, Wash. For example, the administrator may define a rights management policy for all senders and/or recipients located in a certain building or belonging to a certain organizational group or some combination thereof—of these or possibly other different user account attributes.

Alternative embodiments contemplated by the present invention also provide for methods for dynamically applying a rights management policy to a message by allowing an administrator to associate certain rights management policies with certain attributes of the message. In such an embodiment the administrator may associate certain right management policies based on such attributes of the message as the content, the sending and receiving parties, and the date of the message.

A further method of the present invention provides a method for dynamically applying a rights management policy to a message by allowing an administrator to associate certain rights management policies with certain environmental attributes. For example, the administrator may associate certain right management policies based on such environmental attributes as the recipient's location, the time of day, the level of network traffic, whether the recipient is on-line or off-line, and certain software and/or hardware configuration on the recipient's computing device.

IV. Automatic Updating of a Rights Management Protected Message

Figure 5:
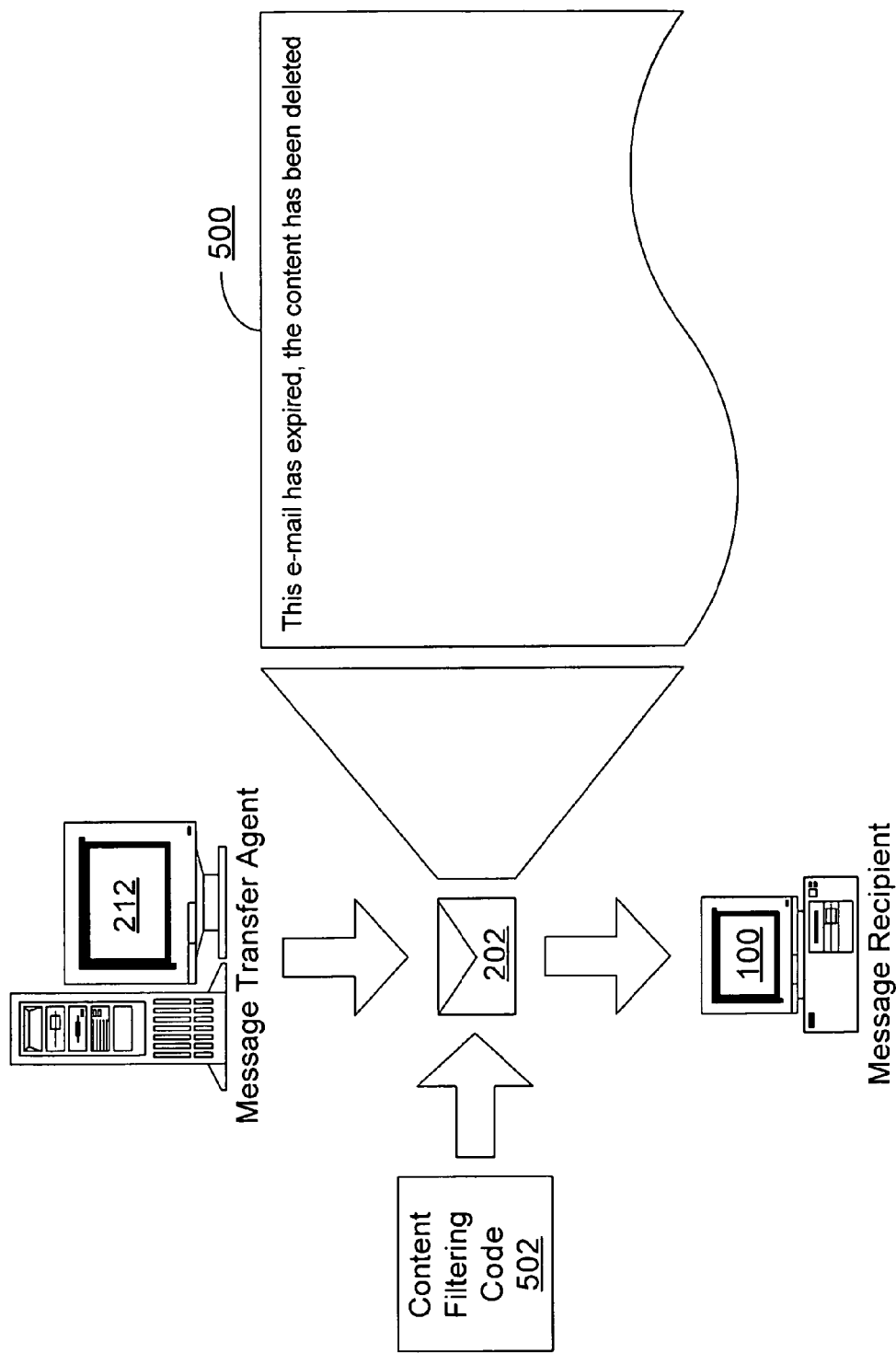
FIG. 5 is a schematic diagram showing an exemplary method for expiring content of a rights management protected message.

One feature of a rights management protected document is to set expiry information on the document. When an author sets rights management protection on a document or an e-mail he is given the option to expire the content. Turning to FIG. 5, the expiration of a rights management protected message 202 is illustrated. The behavior of expiration is such that when expired, the message 202 that is opened by a message recipient 100 is empty. Under the covers, the content is still there, but at runtime it is replaced in the message body 500 with a notification to the recipient that the content has expired. The stripping of the content is programmatically achieved by content filtering code 502 which determines that, before the opening of the message, the expiration condition(s) set by the message sender are satisfied.

The above illustrated process is less than satisfactory for a number of reasons. First, the point of setting an expiration date on a piece of content is to assure the author that no one will be able to access the content after the expiration date has passed. Given enough time with a rights management protected document, a skilled hacker could break open the document. Second, many corporations have e-mail retention policies that apply to specific types of information. For example, a law firm may require that all e-mail about a specific case is to be deleted after 2 years. Thus, all existing e-mail with these policies would necessarily need to be purged from the message transfer agent at the appropriate time. If the content of the e-mail is not entirely deleted then the rights management server can, in theory, crack the content resulting in content which is not completely deleted and is still retrievable. Third, with the continuing proliferation of e-mail coupled with rich (and large) content, users are sending more and bigger e-mail than ever before. As a result, e-mail administrators are forced to allocate more and more disk space for their users. By allowing administrators the option to delete expired rights management content (both e-mails and attachments) this situation can be alleviated.

Figure 6:
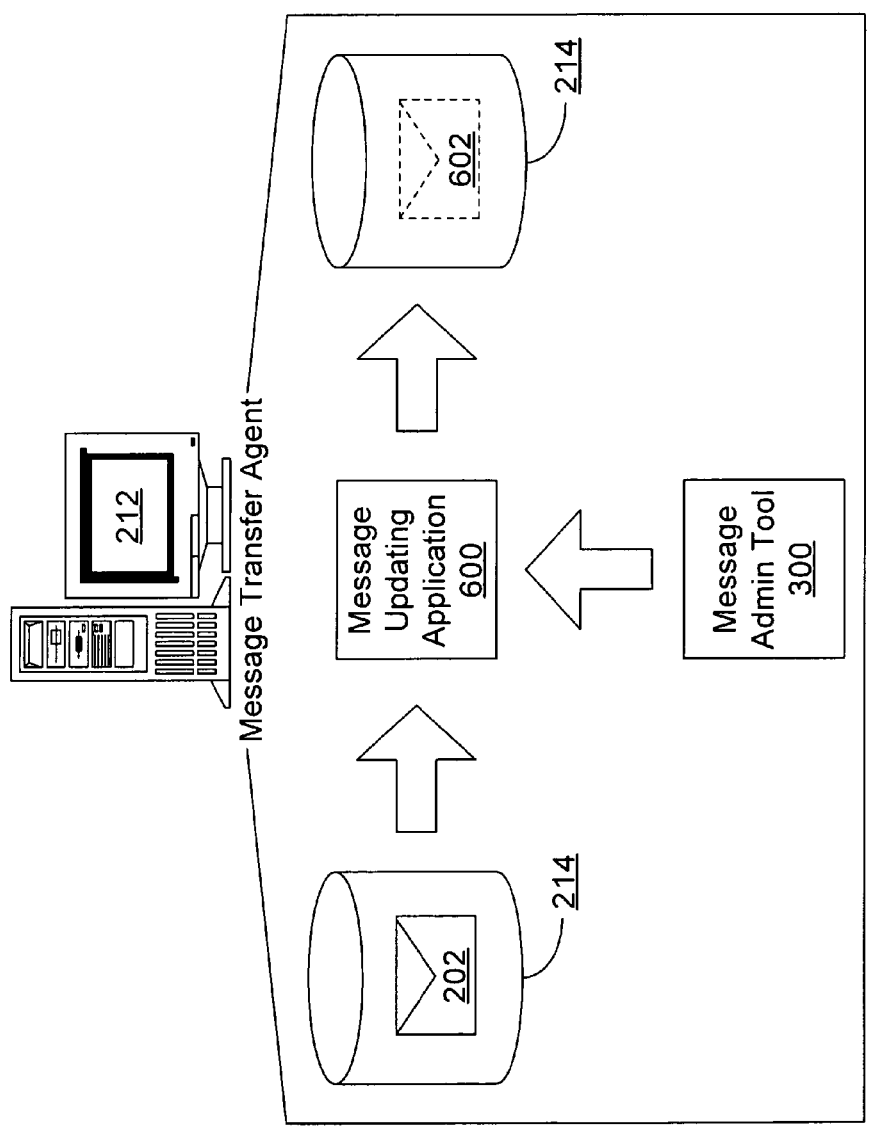
FIG. 6 is a schematic diagram showing the method of the present invention for automatic updating of a rights management protected message.

With reference to FIGS. 6 and 7 a method for automatic updating of a rights management protected message 202 is illustrated. The method assures that any expired rights management protected message 202 or a rights management protected attachment to a message is deleted or updated as it passes through a message transfer agent 212. Beginning with step 700, the message 202 arrives in the message store 214. Next, in step 702, the message 202 is scanned for rights management protected messages and/or attachments. This may be accomplished by recognizing the content-class or the Mail Application Programming Interface (MAPI) property.

Continuing with step 704, for rights management protected messages 202, the message transfer agent 212 pre-licenses the message 202. Pre-licensing is a method where rather than requiring the message recipient to submit a user certificate and request for a use license to the rights management server, the message transfer agent is able to obtain a use license on behalf of the message recipient. Accordingly, the message recipient can access the use license from the message transfer agent and decrypt protected content without having to request the use license from the rights management server. For further information refer to U.S. Pat. No. 7,210,165, which is herein incorporated in it entirety for everything it describes.

Upon pre-licensing the message 202, in step 706, an additional MAPI, or alternatively a Multipurpose Internet Mail Extensions (MIME), property is created that contains the signed Extended Rights Markup Language (XrML) data. XrML is a rights expression language (REL) standard based on XML. XrML offers a common, simple-to-use means for expressing and managing rights and policies for digital content and services. It is a flexible, extensible and interoperable standard equipped to meet any organization's needs, regardless of industry, platform, format, media type, business model or delivery architecture. For further information see http://www.xrml.org, which is herein incorporated in its entirety for everything it describes.

Next, in step 708, using a message administration tool 300 the message administrator can configure a message updating application 600 to parse the XML string to determine whether or not the content is expired. The message administrator may schedule for the message transfer agent 212 to execute the message updating application 600 on a regular interval (e.g., daily, hourly) or on-demand. Alternatively, the message transfer agent 212 could make use of the rights management "license reader" utility (not pictured) to parse the XrML data to determine the expiry information. Next, in step 710, expired content is scanned for character-set, stripped of all attachments and non-RFC822 headers. Finally, in step 712, the message body 602 may be populated with a canned message (e.g., "The rights management protected content of this message has expired.") according to the character-set of the original message.

While the above example illustrates a method for automatic updating of a rights management protected message, several alternative embodiments are also contemplated by the present invention. In the above example the message may instead be purged entirely as opposed to remaining in the message store with the tombstone as a message body replacement. Alternatively, the message body may be refreshed with content more current than the expired content.

For further information see Microsoft Corporation, "Microsoft Rights Management Solutions for the Enterprise: Persistent Policy Expression and Enforcement for Digital Information", http://www.microsoft.com/windowsserver2003/docs/RMS.doc, June 2003, which is herein incorporated in its entirety for everything it describes.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

The invention claimed is:

1. A computerized system for updating content in an electronic document, wherein the updating relies on the existence of a persisted policy scheme, said system comprising:
   a rights management server operatively connected to a data communication network, said rights management server storing the persisted policy schema, and
   a message transfer agent computing device operatively connected to the data communication network, said agent computing device having a document store associated therewith, said agent computing device configured to execute instructions for:
      accepting the electronic document into the document store via the data communication network;
      accessing the persisted policy schema stored on the rights management server via the data communication network;
      identifying one or more rights management protections associated with content of the electronic document, said rights management protections being defined by the persisted policy scheme;
      pre-licensing the accepted electronic document by obtaining, on behalf of a user, a use license associated with the content of the electronic document, said use license being obtained from the rights management server via the data communication network and being defined by the persisted policy scheme;
      determining whether the content of the electronic document has exceeded the rights management protections defined by the persisted policy scheme;
      modifying a portion of the content corresponding to the exceeded right management protections when the content of the electronic document has exceeded the rights management protections; and
      permitting use of the modified content of the electronic document in accordance with the defined restrictions of the obtained use license.

2. The computerized system of claim 1, wherein the electronic document is an electronic mail (e-mail) communication.

3. The computerized system of claim 1, wherein the agent computing device determines whether the content of the electronic document has exceeded the rights management protections defined by the persisted policy scheme and modifies the portion of the content corresponding to the exceeded right management protections on a scheduled interval.

4. The computerized system of claim 1, wherein the agent computing device determines whether the content of the electronic document has exceeded the rights management protections defined by the persisted policy scheme and modifies the portion of the content corresponding to the exceeded right management protections on an ad-hoc basis.

5. The computerized system of claim 1, further comprising a message sender computing device operatively connected to the data communication network, said sender computing device configured to execute instructions for transmitting the electronic document via the data communication network.

6. The computerized system of claim 5, wherein said sender computing device comprises a mobile computing device, and wherein said data communication network comprises a wireless communication network.

7. The computerized system of claim 1, further comprising a message recipient computing device, and wherein the agent computing device is further configured to execute instructions for transmitting the electronic document to the recipient computing device via the data communication network in response to permitting use of the modified content of the electronic document.

8. The computerized system of claim 7, wherein said recipient computing device is configured to execute instructions for receiving the transmitted electronic document via the data communication network, said recipient computing device using the modified content of the electronic document in accordance with the defined restrictions of the obtained use license.

9. A computerized method for updating content in an electronic document, wherein the updating relies on the existence of a persisted policy scheme on a rights management server, said rights management server operatively connected to a data communication network, said method comprising:

accepting, by a transfer agent computing device, the electronic document into a document store associated with said transfer agent computing device, said transfer agent operatively connected to the data communication network and said document store located remotely from the rights management server and connected therewith via the data communications network;

identifying, by the transfer agent computing device, one or more rights management protections associated with content of the electronic document, said rights management protections being defined by the persisted policy scheme on the rights management server;

obtaining, by the transfer agent computing device on behalf of a user, a use license associated with the content of the electronic document to pre-license the electronic document, said use license being defined by the persisted policy scheme;

determining, by the transfer agent computing device, whether the content of the electronic document has exceeded the rights management protections defined by the persisted policy scheme;

modifying, by the transfer agent computing device, a portion of the content corresponding to the exceeded right management protections when the content of the electronic document has exceeded the rights management protections; and permitting, by the transfer agent computing device, use of the modified content of the electronic document in accordance with the defined restrictions of the obtained use license.

10. The computerized method of claim 9, wherein the electronic document is an electronic mail (e-mail) communication.

11. The computerized method of claim 9, wherein the determining and modifying are performed on a scheduled interval.

12. The computerized method of claim 9, wherein the determining and modifying are performed on an ad-hoc basis.

13. The computerized method of claim 9, further comprising transmitting, by a message sender computing device, the electronic document.

14. The computerized method of claim 13, wherein said message sender computing device comprises a mobile computing device.

15. The computerized method of claim 9, further comprising transmitting, by the transfer agent computing device, the electronic document to a message recipient computing device in response to permitting use of the modified content of the electronic document.

16. The computerized method of claim 15, further comprising receiving, by the message recipient computing device, the transmitted electronic document, said message recipient computing device using the modified content of the electronic document in accordance with the defined restrictions of the obtained use license.

17. One or more computer storage media having stored thereon computer-executable instructions for updating content in an electronic document, wherein the updating relies on the existence of a persisted policy scheme on a rights management server, said computer-executable instructions comprising instructions for:

accepting the electronic document into a document store associated with a transfer agent computing device;

identifying one or more rights management protections associated with content of the electronic document, said rights management protections being defined by the persisted policy scheme on the rights management server;

obtaining a use license associated with the content of the electronic document to pre-license the electronic document, said use license being defined by the persisted policy scheme;

determining whether the content of the electronic document has exceeded the rights management protections defined by the persisted policy scheme;

modifying a portion of the content corresponding to the exceeded right management protections when the content of the electronic document has exceeded the rights management protections; and permitting use of the modified content of the electronic document in accordance with the defined restrictions of the obtained use license.

18. The one or more computer storage media of claim 17, wherein the electronic document is an electronic mail (e-mail) communication.

19. The one or more computer storage media of claim 17, further comprising computer-executable instructions for transmitting the electronic document to a recipient computing device in response to permitting use of the modified content of the electronic document.

20. The one or more computer storage media of claim 19, wherein said recipient computing device is configured to execute instructions for receiving the transmitted electronic document, said recipient computing device using the modified content of the electronic document in accordance with the defined restrictions of the obtained use license.

\* \* \* \* \*